(12) United States Patent
Berwald

(10) Patent No.: US 11,901,790 B2
(45) Date of Patent: Feb. 13, 2024

(54) ELECTROMAGNETIC ACTUATION ASSEMBLY

(71) Applicant: Sigma Powertrain, Inc., Livonia, MI (US)

(72) Inventor: Thomas J. Berwald, Grand Haven, MI (US)

(73) Assignee: Sigma Powertrain, Inc., Livonia, MI (US)

( * ) Notice: Subject to any disclaimer, the term of this patent is extended or adjusted under 35 U.S.C. 154(b) by 303 days.

(21) Appl. No.: 17/494,783

(22) Filed: Oct. 5, 2021

(65) Prior Publication Data

US 2022/0029515 A1 Jan. 27, 2022

Related U.S. Application Data

(63) Continuation-in-part of application No. 16/903,306, filed on Jun. 16, 2020, now Pat. No. 11,139,097.

(60) Provisional application No. 62/862,406, filed on Jun. 17, 2019.

(51) Int. Cl.
*H02K 41/03* (2006.01)

(52) U.S. Cl.
CPC .................. *H02K 41/031* (2013.01)

(58) Field of Classification Search
CPC . H01F 7/081; H01F 7/02; H01F 27/28; H01F 7/16; H01F 7/1615; H01F 7/13; H02K 41/031; H02K 2213/03; H02K 41/033
See application file for complete search history.

(56) References Cited

U.S. PATENT DOCUMENTS

| | | | | |
|---|---|---|---|---|
| 5,365,210 A * | 11/1994 | Hines | ..................... | H01F 7/1615 335/173 |
| 5,896,076 A * | 4/1999 | van Namen | .......... | H01F 7/1615 335/229 |
| 2009/0127059 A1 * | 5/2009 | Knoblauch | ........... | F16D 27/118 192/84.92 |
| 2015/0014116 A1 * | 1/2015 | Kimes | ................... | F16D 41/125 192/84.1 |

* cited by examiner

*Primary Examiner* — Mohamad A Musleh
(74) *Attorney, Agent, or Firm* — Simonelli IP, PLLC

(57) ABSTRACT

A linear actuator includes an electromagnetic coil and a stator cover extending over the electromagnetic coil. A set of magnets are disposed end-to-end to form a ring. The magnets are adjacent the electromagnetic coil but offset from the center of the coil. A ferromagnetic central ring disposed within the coil at the inner diameter thereof and next to the magnets. A non-ferromagnetic ring disposed within the coil at the inner diameter thereof extending between the central ring and the other side of the stator cover. A translator is disposed between the magnets and the central axis. The translator is latchable between two positions within the linear actuator depending on the magnetic flux and the direction in which the electric current is flowing.

2 Claims, 19 Drawing Sheets

ELECTROMAGNETIC ACTUATION ASSEMBLY

This patent application is a continuation-in-part of U.S. Pat. No. 11,139,097 B2, which claims priority to U.S. provisional patent application 62/862,406, filed on Jun. 17, 2019, the disclosures of which are hereby incorporated by reference.

BACKGROUND ART

1. Field of the Invention

The invention relates to an electromagnetic actuation assembly for operation in a powertrain assembly for a vehicle movable using electric motive power. More particularly, the invention relates to an electromagnetic actuation assembly using magnets that are axially secured within the stator housing.

2. Description of the Related Art

Electromagnetic actuation assemblies are utilized throughout industry. An electric current is sent through a conductive coil of wire to create a magnetic field. This magnetic field acts on a translator to move it in one direction or two directions, depending on the design. A lightweight, compact electromagnetic actuation assembly utilizing a simplified design is necessary as more and more devices are powered by electricity.

SUMMARY OF THE INVENTION

A linear actuation assembly includes an electromagnetic coil configured to allow electric current to pass therethrough in either direction creating magnetic flux based on the electric current and its direction. The electromagnetic coil defines a center axis, an inner diameter, and first and second coil sides. A stator cover extends over the electromagnetic coil. The stator cover is fabricated from a ferromagnetic material. The stator cover defines first and second interior surfaces. A set of magnets is disposed end-to-end adjacent the first coil side of the electromagnetic coil at the inner diameter thereof. The set of magnets is fixedly secured with respect to the electromagnetic coil and defining a first side and a second side of the set of magnets. The first side of the set of magnets is disposed adjacent the first interior surface of the stator cover. A ferromagnetic central ring is disposed within the electromagnetic coil at the inner diameter thereof. The ferromagnetic central ring is disposed adjacent the second side of the set of magnets. A translator is disposed between the set of magnets and the central axis of the electromagnetic coil. The translator is latchable between a first position disposed adjacent the first side of the set of magnets and a second position disposed adjacent the second side of the set of magnets in response to the magnetic flux and the direction in which the electric current is flowing.

BRIEF DESCRIPTION OF THE DRAWINGS

Advantages will be readily appreciated as the same becomes better understood by reference to the following detailed description when considered in connection with the accompanying drawings, wherein.

DETAILED DESCRIPTION OF THE DRAWINGS

Figure 1:
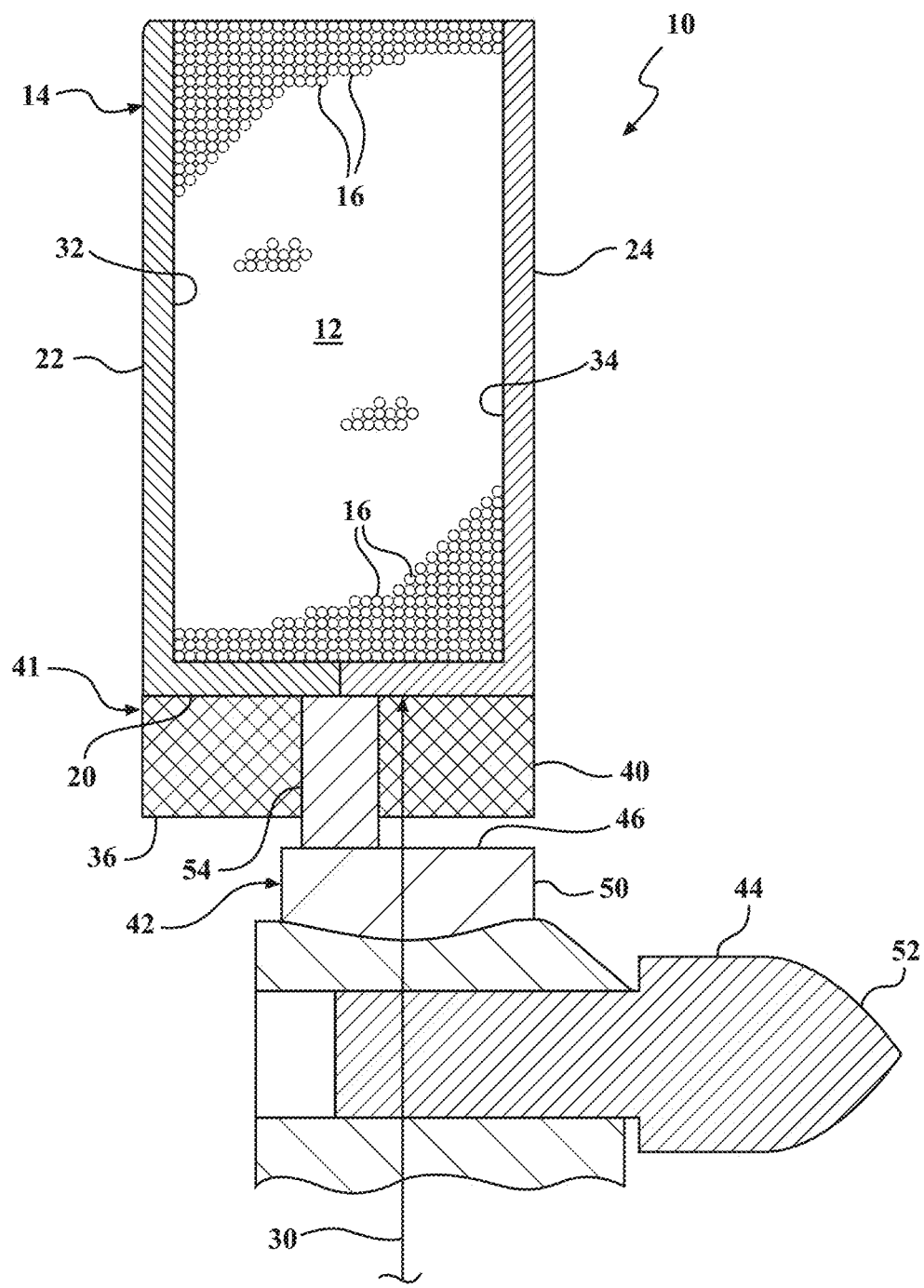
FIG. 1 is a cross-sectional side view, partially cut away, of one embodiment of a linear actuator.

For purposes of this discussion, elements will be identified by reference characters, typically reference numerals. There are several embodiments shown in the Figures that will be described in detail below. For purposes of simplicity, similar elements between the various embodiments will be offset by the hundreds digit, unless otherwise indicated. If an element has characteristics that are different from one embodiment to another, those differences will be discussed when introducing the same element for the new embodiment.

Referring to FIG. 1, one embodiment of a linear actuation assembly is generally indicated at 10. The linear actuation assembly 10 uses a magnetic field created by a current to physically move an element axially in one or two linear directions.

The linear actuation assembly 10 includes an electromagnetic coil 12 wrapped around a bobbin, generally indicated at 14. The electromagnetic coil 12 includes a conductive wire 16 wrapped about a bobbin base 20 and between two bobbin side walls 22, 24. In this embodiment, the bobbin 14 is fabricated of a non-ferrous material, such as a thermoplastic. It should be appreciated by those skilled in the art that the bobbin 14 extends through a continuous loop. In the embodiment shown, the continuous loop is circular, defining a center axis 26, as is best seen in FIGS. 9 through 13. The electromagnetic coil 12 defines an inner diameter 30, which is held in place by the bobbin base 20 and first 32 and second 34 coil sides defined by the two bobbin side walls 22, 24.

A first set of magnets 36 are disposed adjacent the first side 32 of the electromagnetic coil 12 at the inner diameter 30 thereof. The bobbin base 20 extends between the first set of magnets 36 and the inner diameter of the electromagnetic coil 12. Each of the first set of magnets 36 extend along a portion of the electromagnetic coil 12 in an end-to-end manner to complete the continuous loop created by the electromagnetic loop. through an arc, with the total number of the first set of magnets 36 completing the continuous loop defined by the electromagnetic coil 12. In the embodiment shown, each of the first set of magnets 36 extend through an arc, the total of which defines a circle have a diameter substantially equal to the inner diameter of the electromagnetic coil 12.

A second set of magnets 40 are disposed adjacent the second side 34 of the electromagnetic coil 12 at the inner diameter 30 thereof. The bobbin base 20 extends between the second set of magnets 40 and the inner diameter of the electromagnetic coil 12. Each of the second set of magnets 40 extend along a portion of the electromagnetic coil 12 in an end-to-end manner to complete the continuous loop created by the electromagnetic loop. through an arc, with the total number of the second set of magnets 40 completing the continuous loop defined by the electromagnetic coil 12. In the embodiment shown, each of the second set of magnets 40 extend through an arc, the total of which defines a circle have a diameter substantially equal to the inner diameter of the electromagnetic coil 12. The electromagnetic coil 12, together with the bobbin 14, the first set of magnets 36, the second set of magnets 40 and a ring 54, discussed subsequently, are collectively referred to as a stator 41.

The linear actuation assembly 10 includes a translator, generally indicated at 42. The translator 42 is disposed adjacent the first 36 and second 40 sets of magnets. Said another way, the first 36 and second 40 sets of magnets and the ring 54 are disposed between the electromagnetic coil 12 and the translator 42. At least a portion of the translator 42 is fabricated from a ferromagnetic material such that it receives forces due to the magnetic field created by the first 36 and second 40 sets of magnets and the current flowing through the electromagnetic coil 12. The description of the magnetic field and how it acts on the translator 42 will be discussed in greater detail subsequently. The translator 42 typically has a hollow center (not shown) allowing something to extend therethrough, such as a shaft, a hub, etc.

The translator 42 is shown to have a plunger 44 extending out therefrom parallel to the center axis 26. The translator 42 will have at least one plunger 44 and it is contemplated that the translator 42 will have a plurality of plungers 44 (even though only one is shown in any given Figure). When the translator 42 has a plurality of plungers 44, they are spaced equidistantly about a translator edge 46 of the translator 42. The translator edge 46 will complement the continuous loop created by the bobbin 14. Not all the translator 42 needs to be ferromagnetic. However, at least a translator sleeve 50 is ferromagnetic. The translator sleeve 50 may be a continuous layer about the translator 42 or it can be discreet pieces fixedly secured to the translator 42 spaced equidistantly thereabout. In the embodiment shown, the translator sleeve 50 is a full cylinder having a circular cross section.

The plunger 44 has a pointed distal end 52. It should be appreciated by those skilled in the art that the distal end 52 of the plunger 44 may have a shape other than pointed without adding to the disclosure set forth herein. The plunger 44 is fixedly secured to the translator 42 such that it moves linearly, parallel to the center axis 26.

The ring 54 extends between the two sets of magnets 36, 40. The ring 54 may be unitary in construction or it may consist of a composite of ringlets that form the ring 54. In the embodiment shown in FIG. 1, the ring 54 is unitary in construction and is fabricated from a non-ferromagnetic material. In other embodiments, the ring 54 may be fabricated from ferromagnetic material. Alternatively, the ring 54 may be fabricated from one or more ringlets, wherein ferromagnetic ringlets and non-ferromagnetic ringlets may be used together to form the ring 54. In the embodiment shown in FIG. 1, the ring 54 extends between the bobbin base 20 and the translator 42. Laterally, the ring 54 extends between the first 36 and second 40 sets of magnets.

Figure 2:
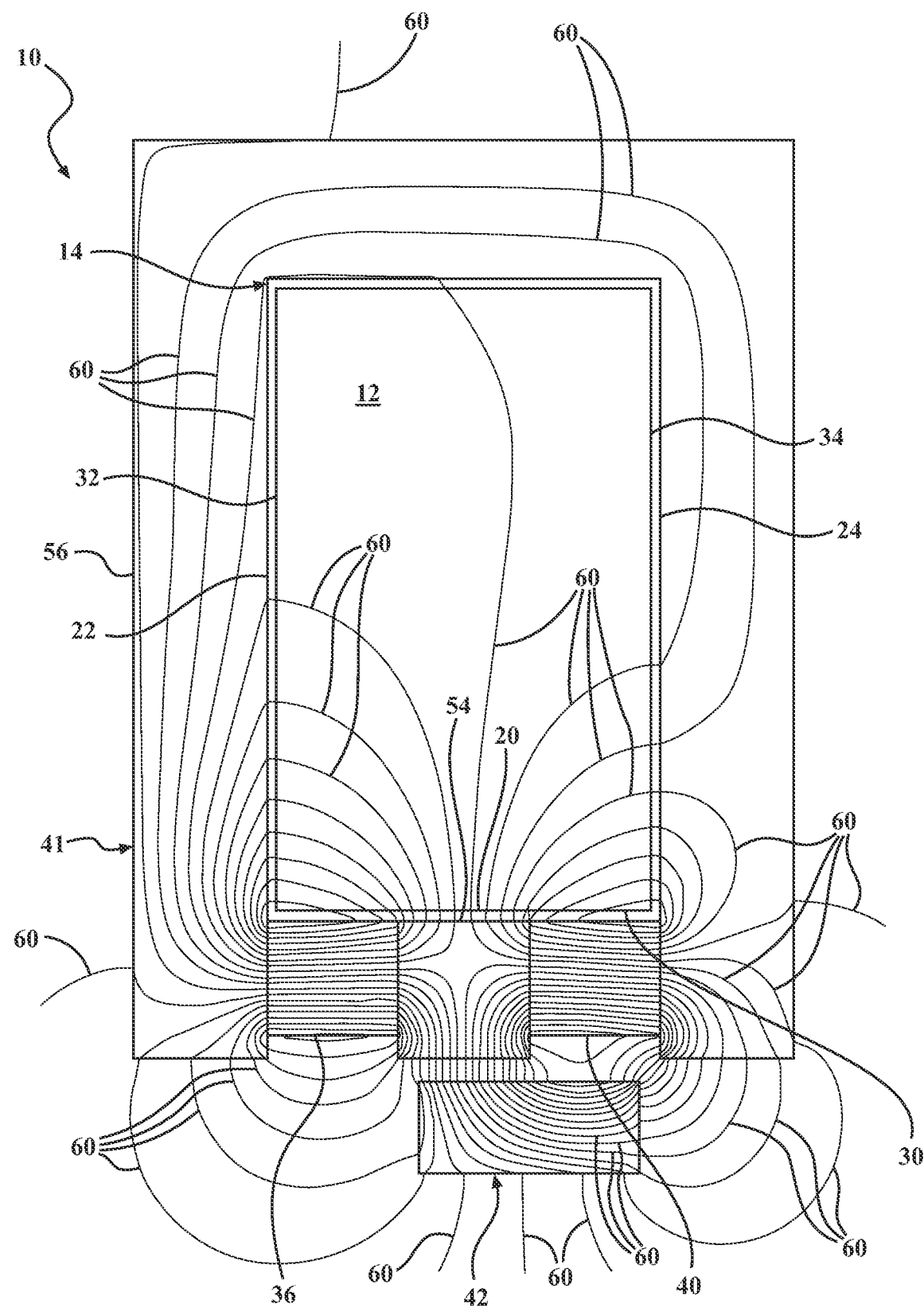
FIG. 2 is a cross-sectional side view of a linear actuator with magnetic flux lines extending therethrough.

Referring to FIG. 2, a magnetic field line plot, also referred to as a magnetic flux line plot, is shown in the cross-sectional view as it flows through the linear actuation assembly 10. For purposes of this illustration, the linear actuation assembly 10 a circularly symmetric assembly, with the axial movement of the translator 42 (also the line of axial symmetry) shown in the x-direction. The radial direction is shown as the y-direction. Since this machine is completely symmetric about its axis, operation (linear motion of the translator 42) does not depend on any given rotational position of the translator 42 with respect to the center axis 26. Thus, the linear actuation assembly 10 can operate with the translator 42 either when it is rotating or when it is not rotating.

The stator 41, shown in cross-section, includes a stator cover 56, fabricated of ferromagnetic material, enclosing the single electromagnetic coil 12, the first 36 and second 40 sets of magnets, separated by the continuous rectangular cross section ferrous metal (steel/iron) ring 54. The stator cover 56 is open in that the first 36 and second 40 sets of magnets, along with the ring 54 are exposed to the translator 42. In a practical application, the ring 54 is fixed secured to the bobbin 14 (not shown in FIG. 2 for purposes of simplicity), which is mostly non-ferrous material.

The magnetic field lines 60 that are shown in FIG. 2 have been determined by a commercial magnetic finite element analysis (MFEA) software package. The magnetic field solution shown in FIG. 2 is for the case of no coil current in the electromagnetic coil 12, and the axial position of the translator 42 is somewhat past, to the right of, the "neutral" or center position. Translator locations on this side of the center position will be termed "on" side locations, as it is assumed that translator movement to this side of center will turn the motor mechanical load (typically a clutch mechanism) "on." It is further assumed that movement of the translator 42 to positions left of center will turn the load "off." Note that the structure of the stator 41 shown in FIG. 2 is depicted as symmetrical about the center, x=0, axial position. It should be appreciated by those skilled in the art that the linear actuation assembly 10 need not be symmetric, and in certain applications would in fact lead to undesired operation due to an unbalanced magnetic material environment surrounding or near the location of the linear actuation assembly 10 within its application housing. The remainder of the discussion of the linear actuation assembly 10 will assume a symmetric construction, as a simplification for explanation purposes. In addition, the discussion will assume the absence of any neighboring magnetic material bodies.

Figure 3:
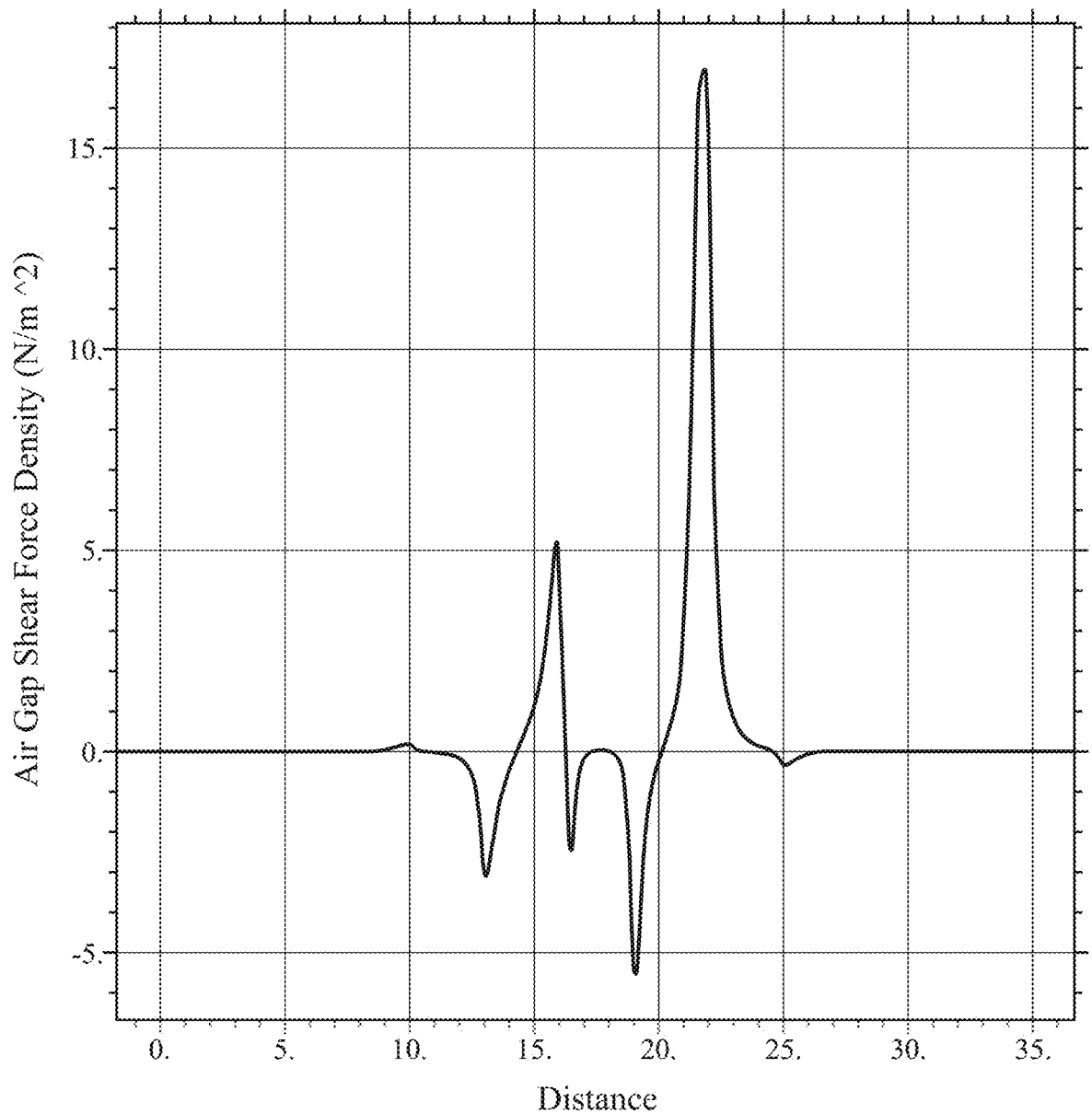
FIG. 3 is a graphic representation of air gap shear force density as a function of distance for the embodiment shown in FIG. 2.

The magnetic field lines 60 are focused or concentrated in closed paths with the majority of the lines flowing through the first 36 and second 40 sets of magnets, the ring 54 and the translator 42. In general, these lines 60 of force tend to flow in paths with a majority of iron content due to the ease of the magnetic field production within the iron material. Examining the field lines that do cross the air gap between the stator 41 and the translator 42, it can be seen that some of them follow a path, to or from the first set of magnets 36 to the translator 42, and some of them follow a path to or from the second set of magnets 40 to the translator 42. Flux lines from the second set of magnets 40 dominate since the translator 42, in the position shown, is closest to the second set of magnets 40. Because the translator 42 is toward the right side in this Figure, there are more magnetic field lines 60 to the right, rendering a net force pulling the entire translator 42 to the right Shearing stress to both the right side and the left side is seen in FIG. 3, which can be matched to the distribution of air gap field lines which "lean" to both the right and left along the air gap. However, the total force (the integrated shear over the air gap x-directed extent surface) shows a net force on the translator 42 to the right, for this particular translator position.

Figure 4:
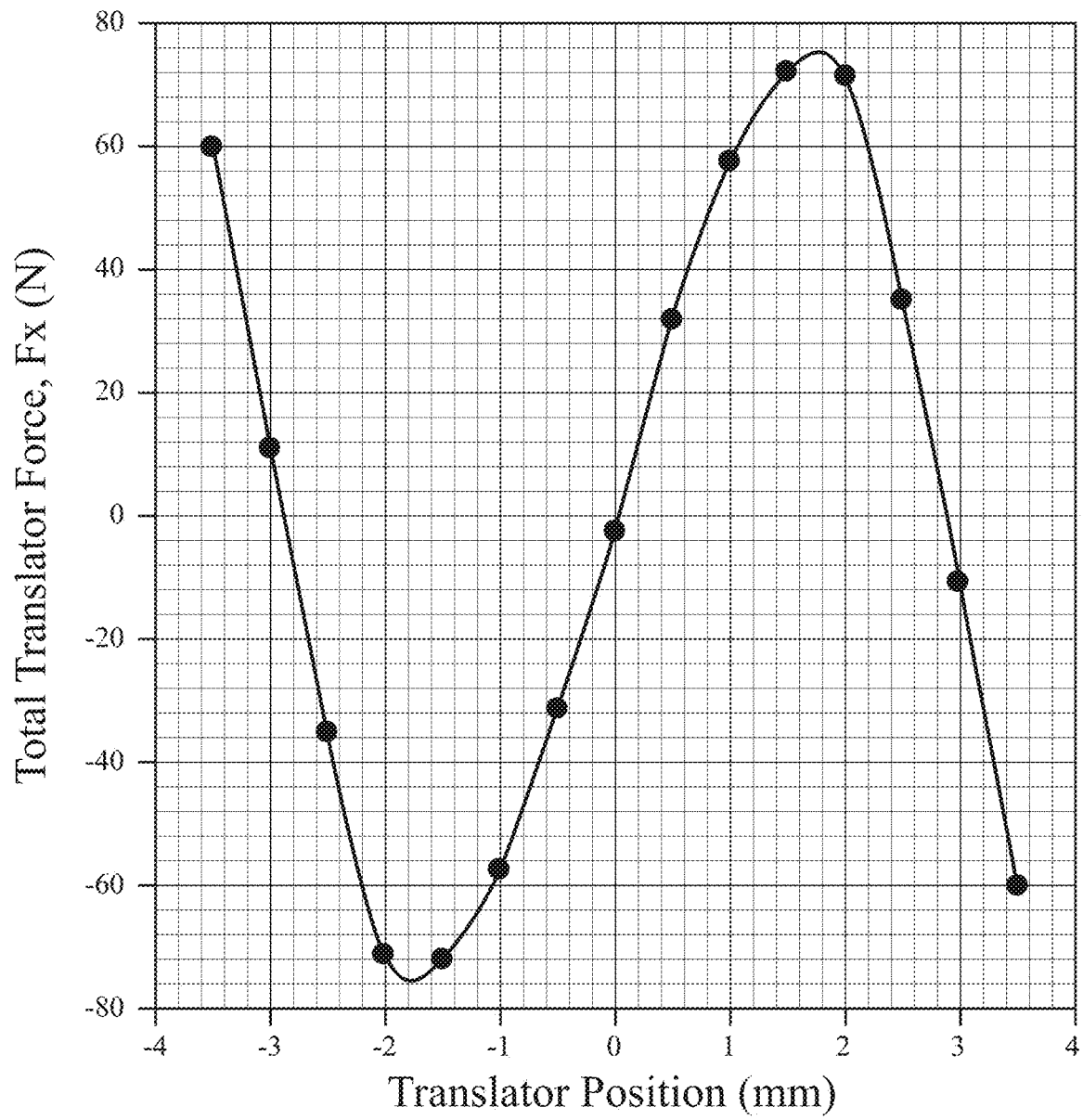
FIG. 4 is a graphic representation of a translator force as a function of its position with respect to it associated stator of the linear actuator shown in FIG. 2.

If the translator 42 is swept from left to right, and the magnetic field lines 60 are recalculated at each position, the a "slide show" of the magnetic field line production due to the translator 42 and sets of magnets 36, 40 as a function of translator position can be produced. Such a presentation would show that when the translator 42 is located to the left of the center or neutral position, the dominant number of air gap crossing flux lines flow radially up and to the left of the position of the translator 42. As such, a left-directed force would be imposed on the translator 4. And conversely, as is the case shown in FIG. 2, when the translator 42 is located to the right of the center position, the majority of air gap flux line flow is radially up and to the right, so a right-directed force on the translator 42 is expected. A plot of the MFEA computed total axial force on the translator 42 as a function of axial position, given in pounds, is shown in FIG. 4. As can be seen, if the translator 42 is positioned to the right of center, it is pushed, due to the second set of magnets 40, to the right, and if positioned to the left of center, it is pushed further to the left due to the first set of magnets 36. This is referred to as the "latching" action of the linear actuation assembly 10. The exact center position, where the left-right pushing force exactly balances to zero, is an unstable equilibrium point, at which even minute movements will result in forces tending to push the translator 42 away for the center position. The two other points shown, near the two axial ends of the stator 41, where the net translational force also passes through a zero value, are stable equilibrium points, where minute movements result in position restoring force production. In practice, there are non-ferrous material mechanical stops placed in the translator axial movement path that limit the extent of the translator travel path to values approximately between the locations of the maximum force production, referred to as the "latch" points of the linear actuation assembly 10. As can be seen in the example shown in FIG. 4, the "on" latch point is approximately at a translator x-position of 1.5 mm, and the "off" latch point in this balanced structure is at x=−1.5 mm. The distance between the two latch points is the maximum travel or "stroke" length of the linear actuation assembly 10.

Figure 5:
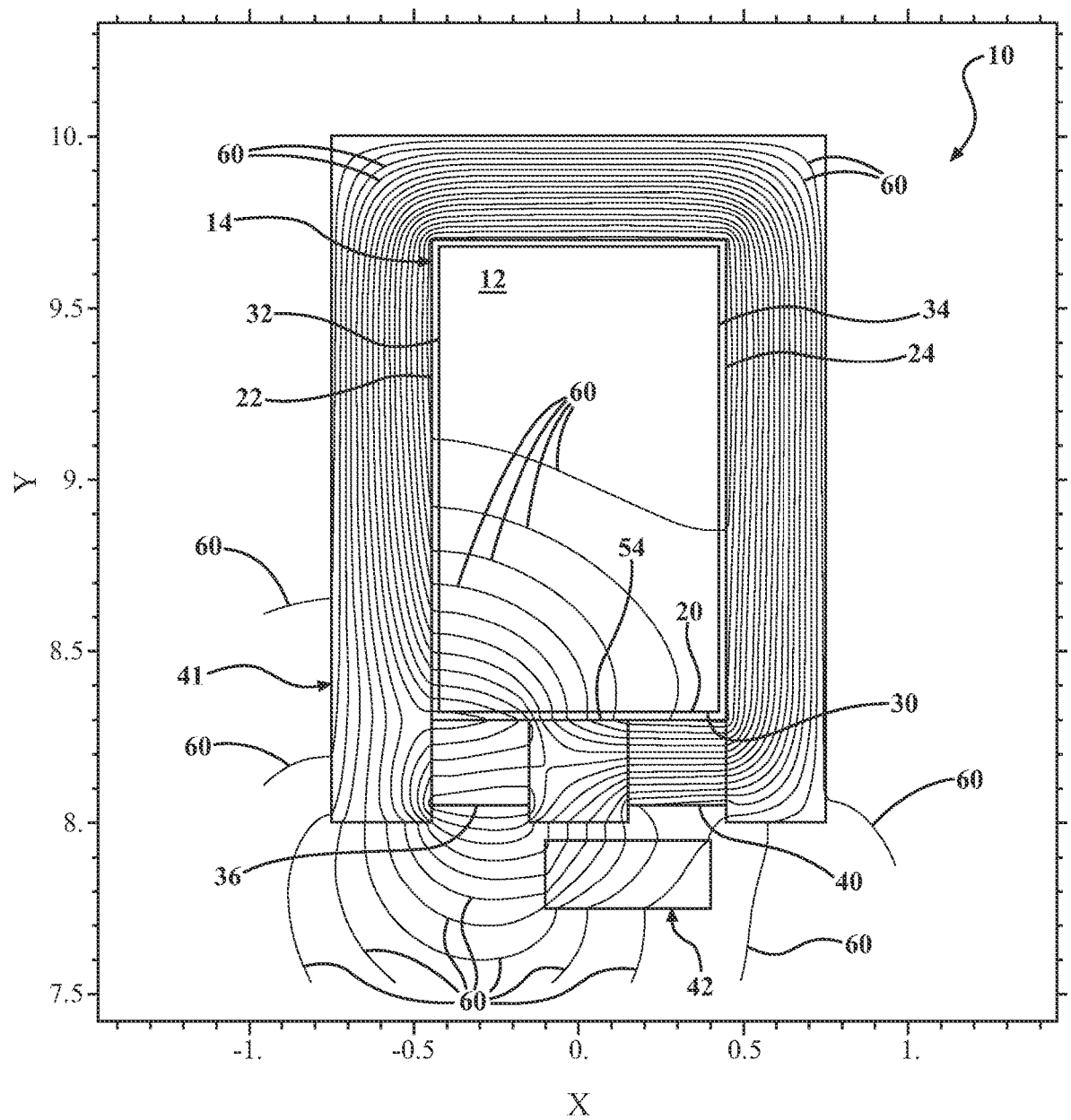
FIG. 5 is a cross-sectional side view of the linear actuator with electrical current flowing through the stator coil to produce the magnetic flux lines shown extending therethrough.
Figure 6:
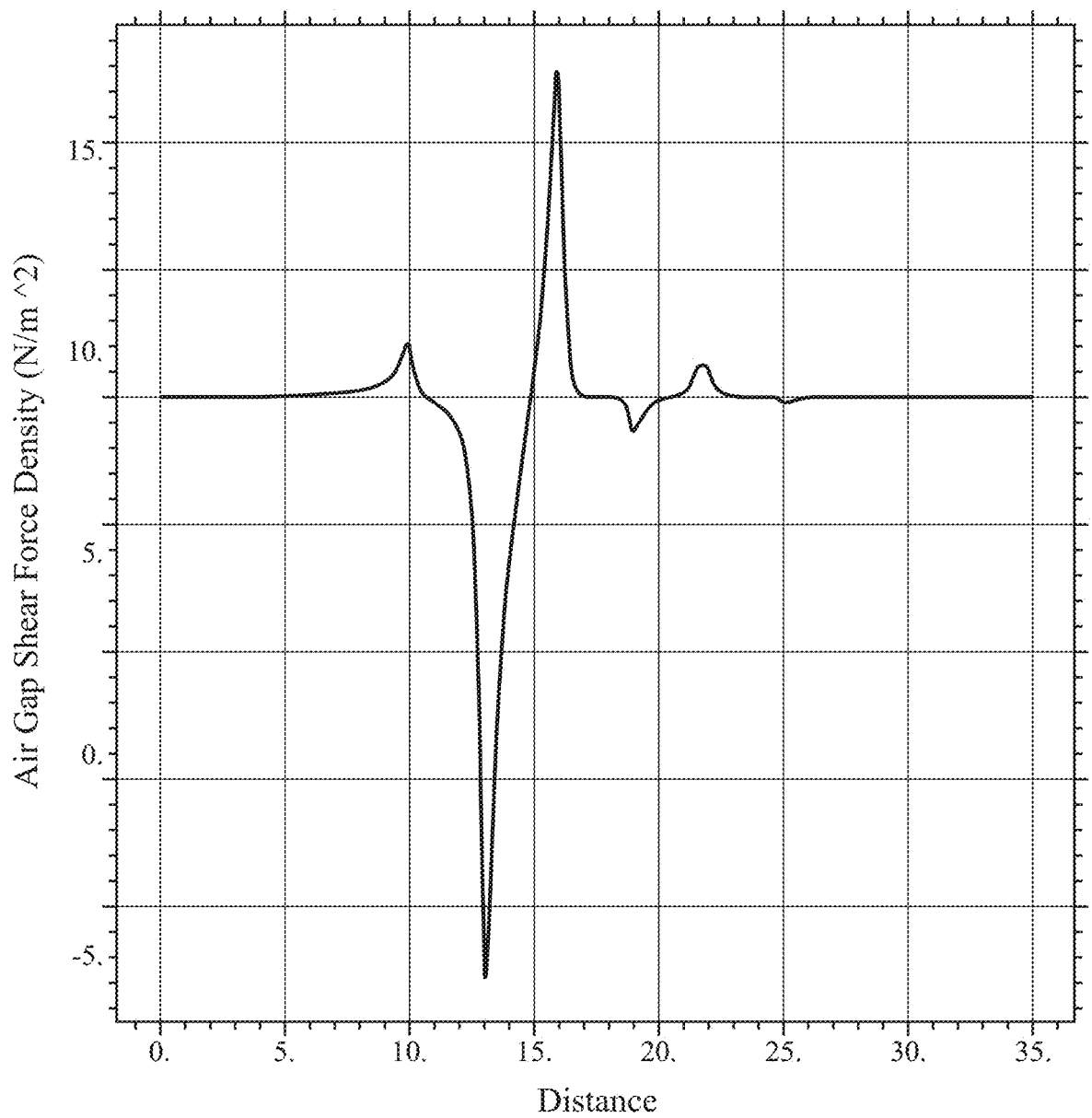
FIG. 6 is a graphic representation of air gap shear force density as a function of distance for the embodiment shown in FIG. 5.

Axial Translation Forces in the Linear Actuation Assembly 10 with Electric Current Consider the same example of the linear actuation assembly 10 as shown in FIG. 2, but with the addition of steady electrical current in the electromagnetic coil 12. A typical MFEA solution for the magnetic field lines 60 for this situation is shown in FIG. 5. A steady current, assumed uniformly distributed in the winding cross section, is assumed to flow into the page, away from the viewer, for the portion of the wires of the electromagnetic coil 12 shown in FIG. 5. The axial magnetization direction of the sets of magnets 36, 40 does not matter (just as long as they were the opposite of each other) in the pure latching force situation of FIG. 2, but it matters very much in this case of "dual" magnetic excitation as a result of current passing through the electromagnetic coil 12 in one direction or the other.

For the case shown in FIG. 5, the axial magnetization of the first set of magnets 36 is stipulated to be to the right, in the plus x-direction, and the axial magnetization of the second set of magnets 40 is stipulated to be to the left, in the minus x-direction. The direction or polarity of the magnetic lines of force in their respective closed "flow" paths, due to the magnets alone, would then be dictated by the particular source set of magnets 36, 40. The polarity direction of the circulating magnetic lines of force due to an electric current is given by the "right hand rule," which states that if the thumb of one's right hand is made to point in the direction of the current flow in a wire, or a coil of wires, with the fingers encircling the cross section of the wire or the coil, the magnetic field lines or flux lines due to the current also encircle the wire or coil cross section and have a circulating direction in the same direction as the curling fingers. In FIG. 5, the magnetic flux lines 60 due the current in the electromagnetic coil 12 in the direction away from the viewer and into the page would flow in the clockwise direction.

The net or total production of magnetic field lines, as shown in FIG. 5, is due to all three magnetic sources, the current in the electromagnetic coil 12 and the two sets of magnets 36, 40, resulting in regions in the linear actuation assembly 10 where the individual sources of magnetic excitation enforce and add with each other; and there are regions where the excitation sources buck or subtract from each other. Since the coil current is assumed to be reversible (plus or minus), the dual source enforcement and bucking regions within the linear actuation assembly 10, and most importantly between the sets of magnets 36, 40, can be changed or adjusted with respect to each other. This is the basis of the controllable/reversible direction of the linear actuation assembly 10.

The flow of the majority of the flux lines 60 produced by the sets of magnets 36, 40 alone resulted in a net force on the translator 42 to the right for the position of the translator 42 shown in FIG. 2. But for the same translator position, with the addition of the stipulated coil current, stipulated both in magnitude and direction, the case shown in FIG. 5, the left/right leaning of the flow of the majority of air gap the flux lines 60 has shifted. The majority of the flux lines 60 now cross the air gap leaning to the left with respect to the translator 42. Thus, the net translational force on the translator 42 also shifts to the left. If the translator 42, by means of a "stop" was, previous to the introduction to coil current, latched in the right hand side "on" position and held there against the "stop" by the continuous "latching" force due to the second set of magnets 40, introduction of coil current as in the case of FIG. 5 would then overpower the latching force to the right and produce a net motoring force to the left, inducing the translator 42 to move to the left. And if the translator 42 does move and subsequently crosses over the center or neutral position, the current could be removed, as the now left directed latching directed force, due to the first set of magnets 36 alone, will enforce the remaining left movement to a similar off-state latching position to the left of the center or neutral position.

Figure 7:
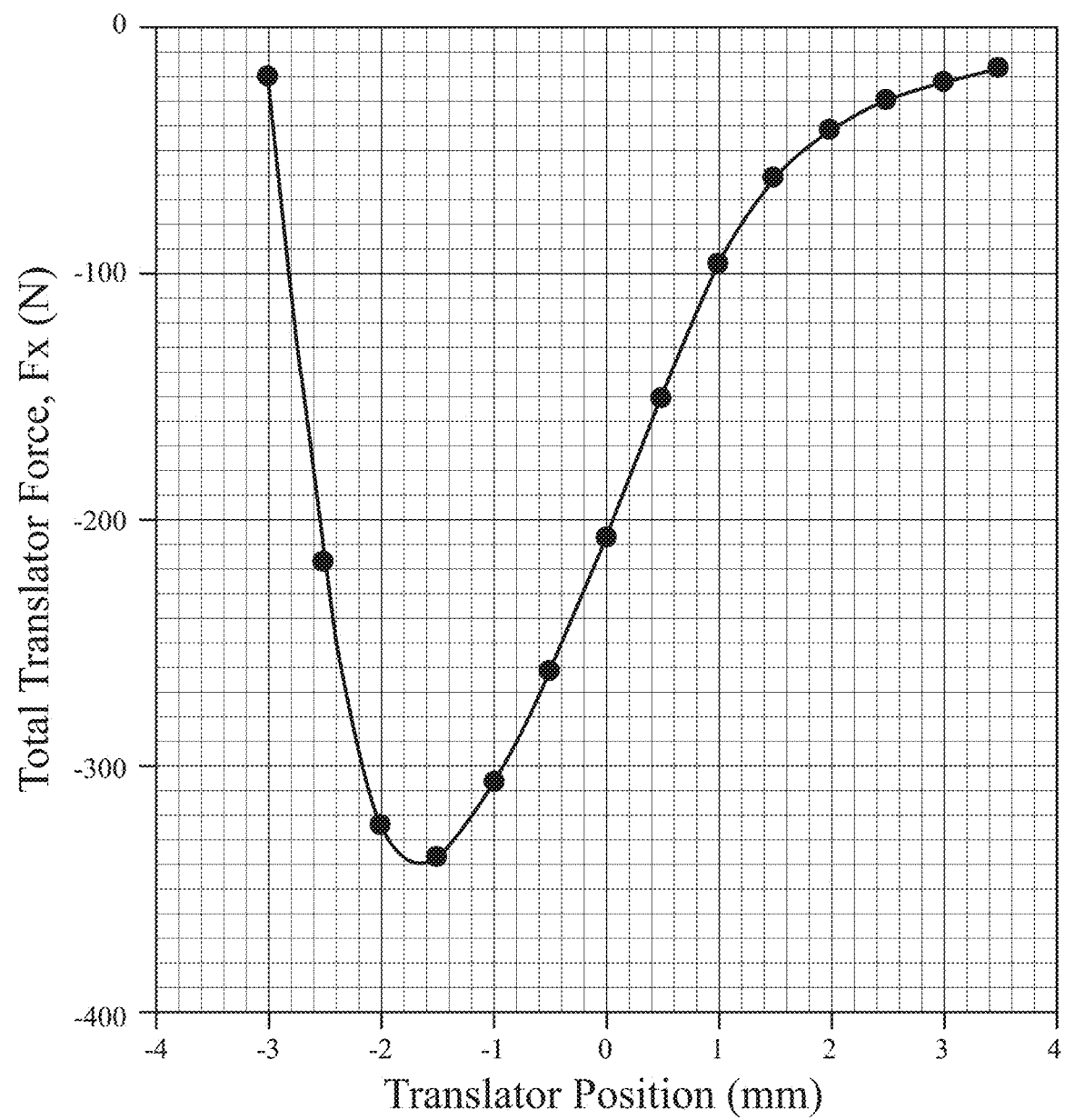
FIG. 7 is a graphic representation of a translator force as a function of its position with respect to its associated stator of the linear actuator shown in FIG. 5.
Figure 8:
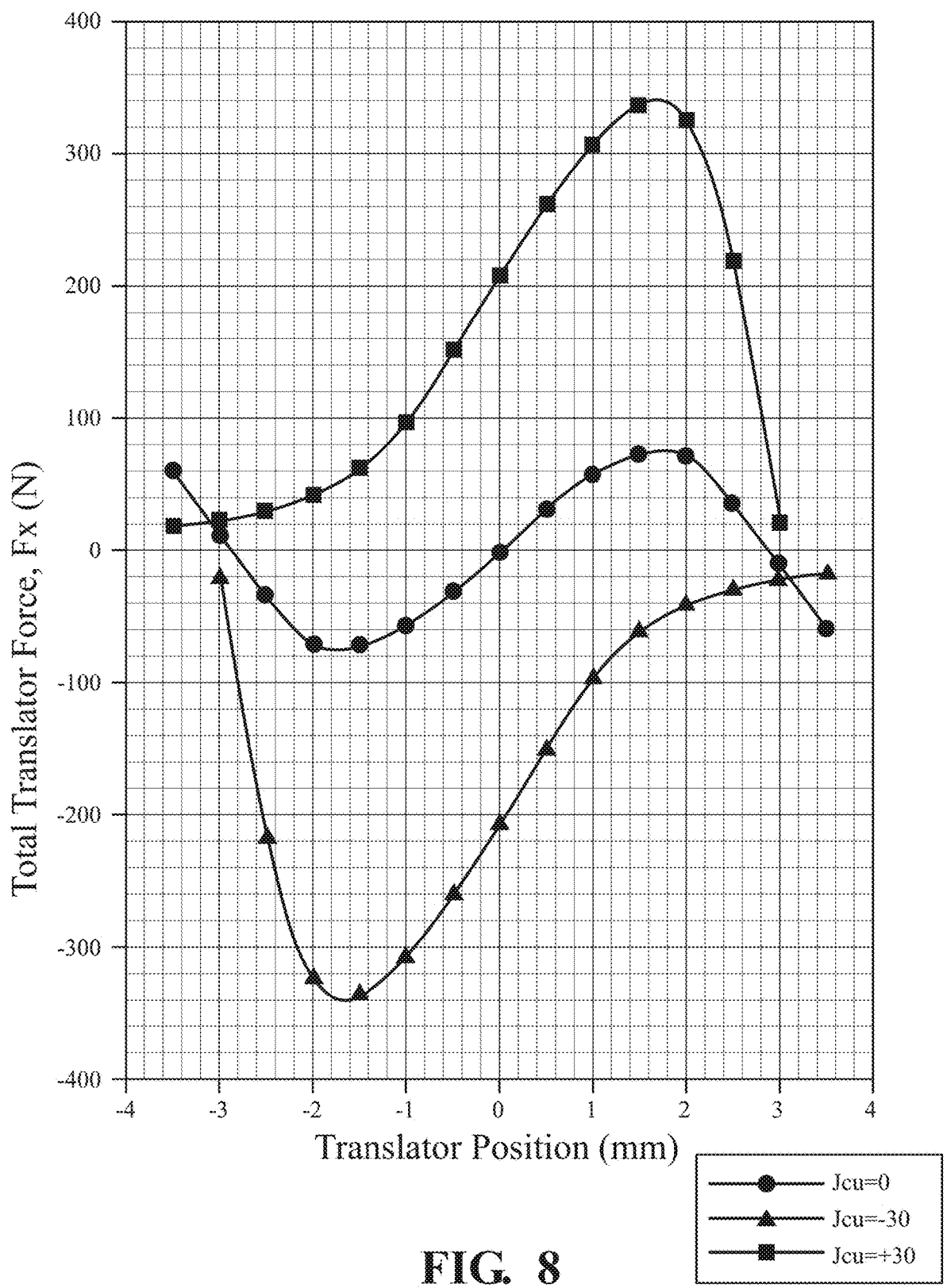
FIG. 8 is a graphic representation of a combined plot of a translator force as a function of its position with respect to its associated stator of the linear actuator shown in FIG. 5 with current shown flowing in both directions.

The results for the total magnetic flux lines 60 within the linear actuation assembly 10 with the same coil current drive as in the case shown in FIG. 5, as a function of the axial position of the translator 42, similar to that given for the previous case of magnet excitation alone, is given in FIG. 7. These solutions show that for the level of coil current assumed the net force on the translator 42 is always negative, to the left, no matter the assumed value of the position of the translator 42. This particularly the case for translator movement limited to the stroke length distance between the "on" and "off" latch points, that is, positions between plus and minus 1.5 mm for the example shown. Finally, since the linear actuation assembly 10 considered here is symmetric with respect to the translator center position, the results given in FIG. 7 for the latch-off direction current drive, apply also for a reverse or latch-on direction current drive, simply by reversing both the translator position (i.e., the sign of x) and the net drive force. A combined plot for both of the current drive cases and the passive case (zero current drive) is given in FIG. 8.

Figure 9:
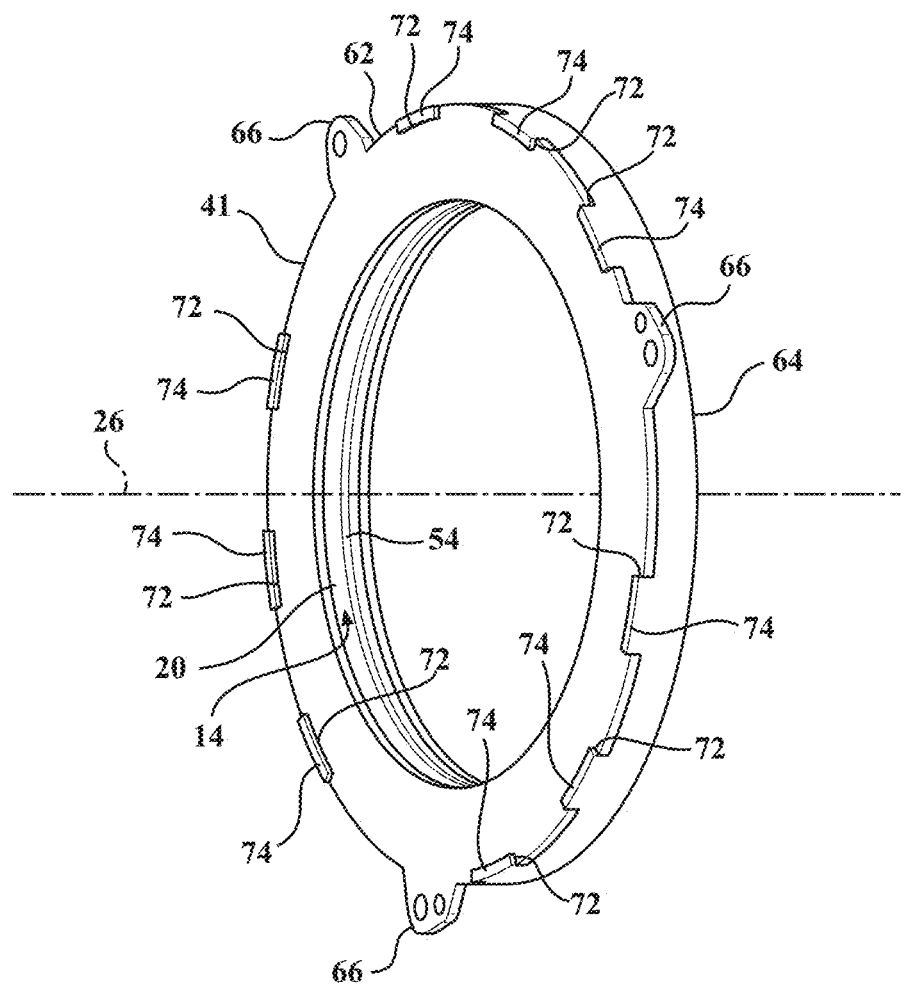
FIG. 9 is a perspective view of one embodiment of a linear actuator.
Figure 10:
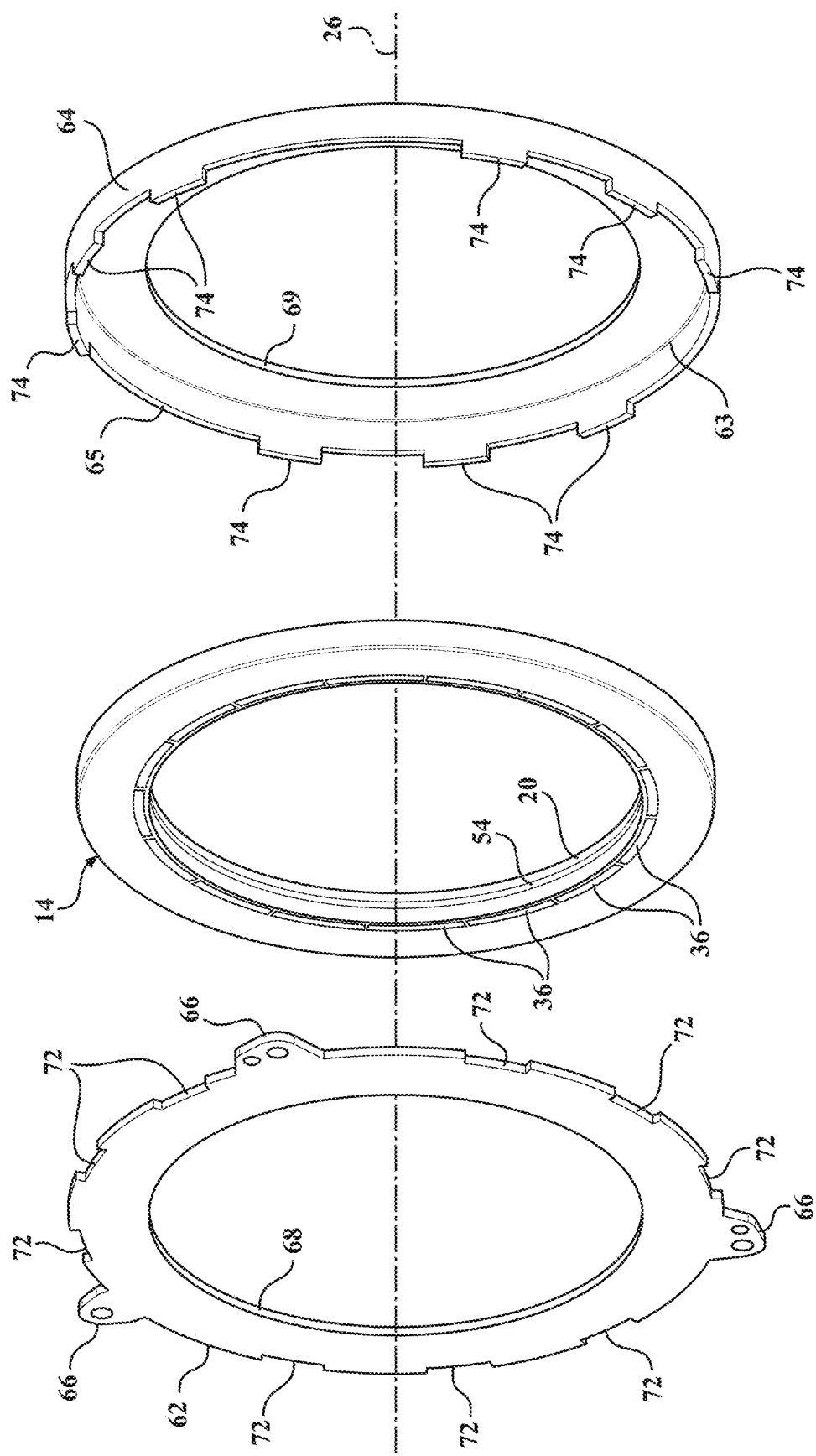
FIG. 10 is an exploded perspective view of the embodiment shown in FIG. 9.

Referring to FIGS. 9 and 10, one embodiment of the stator 41 is shown in perspective view. The stator 41 includes the steel casing or cover 56 including an I-plate 62 and in L-plate 64. The L-plate 64 includes a side plate 63 and a cover plate 65 designed to cover the electromagnetic coil 12 in the bobbin 14. The two plates 62, 64 have inner diameters 68, 69 matching the inner diameter 30 of the electromagnetic coil 12 and are fabricated from a ferromagnetic material. In one embodiment, the ferromagnetic material is steel. The two plates 62, 64 complement each other to form three sides of the stator case 56 for the stator 41 leaving the bobbin base 20 exposed. The two plate 62, 64 form a cylinder to house the bobbin 14 therein and allow the translator 42 and any other mechanical parts that are not a part of the linear actuation assembly 10 that happened to extend therethrough. The ring 54 can be seen exposed to where the translator 42 would be positioned. The I-plate 62 includes fastening flanges 66 designed to secure the stator 41 to a transmission housing 70, discussed subsequently. The I-plate 62 also includes a plurality of recesses 72, designed to receive a plurality of extensions 74 extending out from the L-plate 64.

Figure 11:
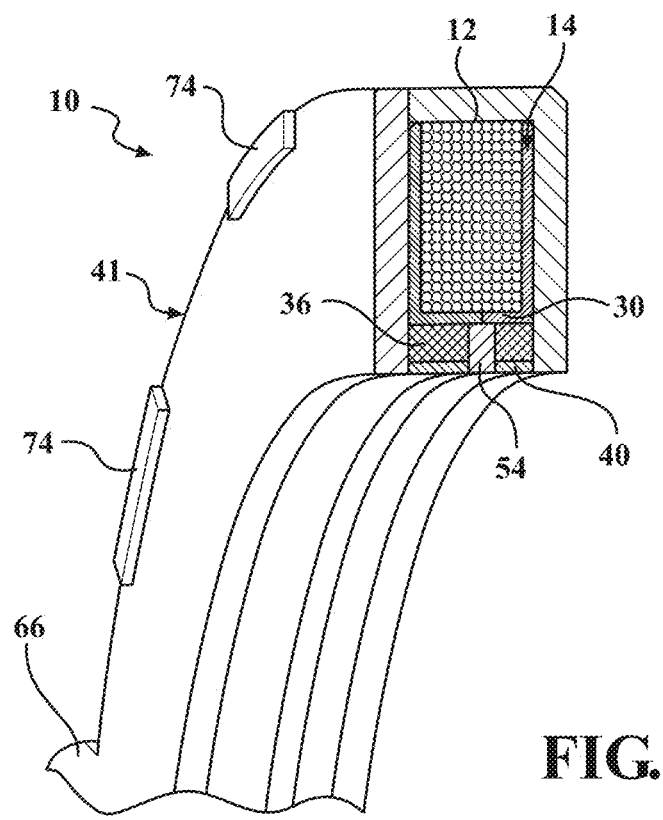
FIG. 11 is a cross-sectional perspective view, partially cut away, of a stator for the embodiment shown in FIG. 9.

Referring to FIG. 11, an alternative embodiment of the linear actuation assembly 10 is shown wherein the primary difference between this stator 41 and the stator 41 of the prior embodiment is that the first set of magnets 36 includes magnets that are larger than the magnets of the second set of magnets 40. Having different size magnets between the first 36 and second 40 sets of magnets may be done for a couple of reasons. One reason they would be different sizes is because the linear actuation assembly 10 may have a default latched position that would require the plunger 44 to be in a particular position when there is no current passing through the electromagnetic coil 12. A second reason they would be different sizes would be that the sizes were designed to compensate neighboring electromagnetic forces that may be generated by other components designed to be adjacent the linear actuation assembly 10.

Figure 13:
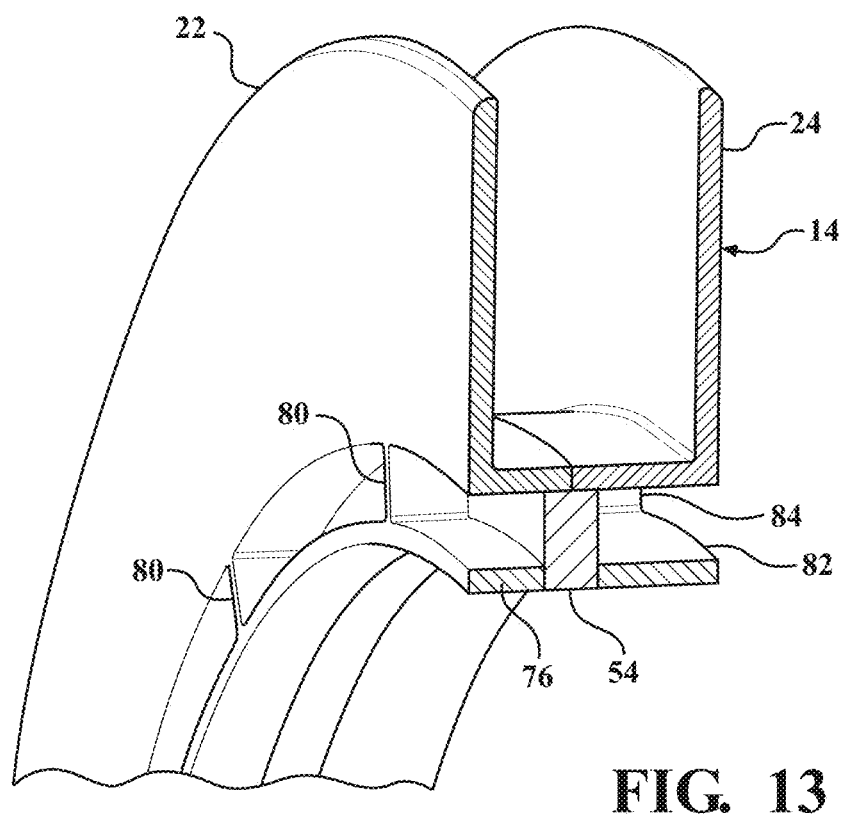
FIG. 13 is a cross-sectional perspective view of the bobbin shown in FIG. 12.
Figure 12:
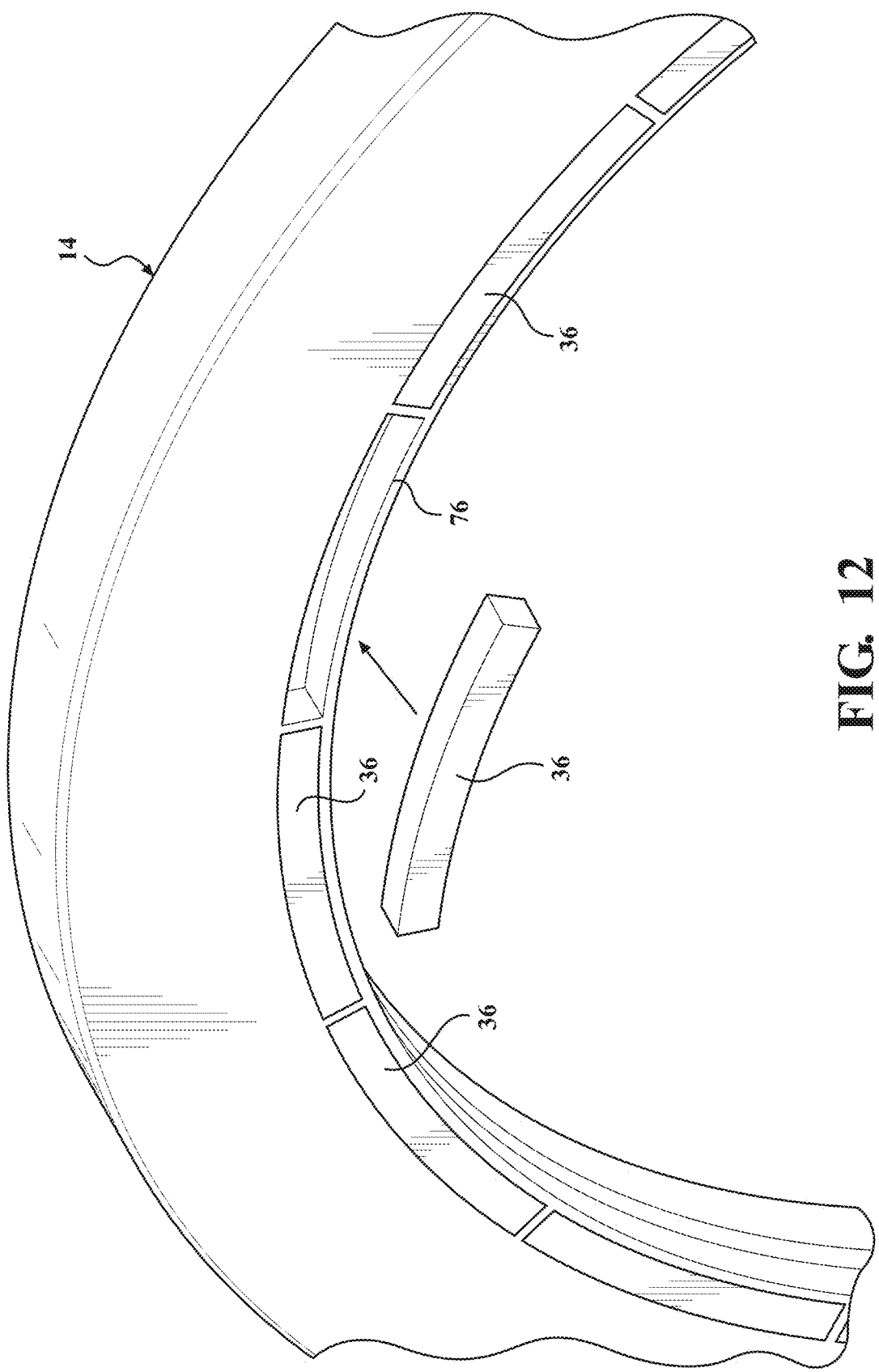
FIG. 12 is an exploded perspective view of a bobbin and magnets used to fabricate the stator shown in FIG. 11.

Referring to FIGS. 12 and 13, and an enlarged view of the bobbin 14 is shown to include a first channel 76. The first channel 76 receives the first set of magnets 36 therein. Each of the first set of magnets 36 extends through an arc such that the first set of magnets 36 will form a circle within the first channel 76. In the embodiment shown, the first channel 76 includes a plurality of partitions 80 that separate each of the first set of magnets 36. The bobbin 14 includes a second channel 82 having partitions 84 (one shown in FIG. 13). Although not shown, the second channel 82 also includes the partitions that will separate each of the second set of magnets 40. In one embodiment, the two bobbin sidewalls 22, 24 are sonically welded to each other and to the ring 54. It should be appreciated by those skilled in the art that the fabrication of the bobbin 14 with the ring 54 may be completed using any method known in the art.

Figure 14B:
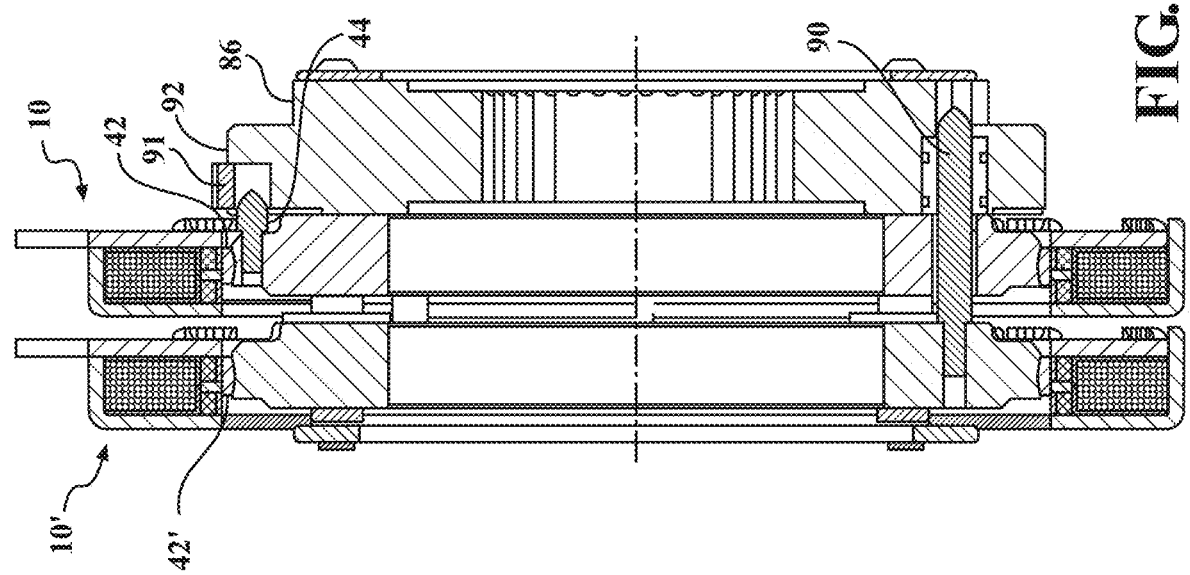
FIGS. 14A and 14B are side views of two clutches incorporating linear actuators with one of the clutches in disengaged and engaged positions, respectively.
Figure 14A:
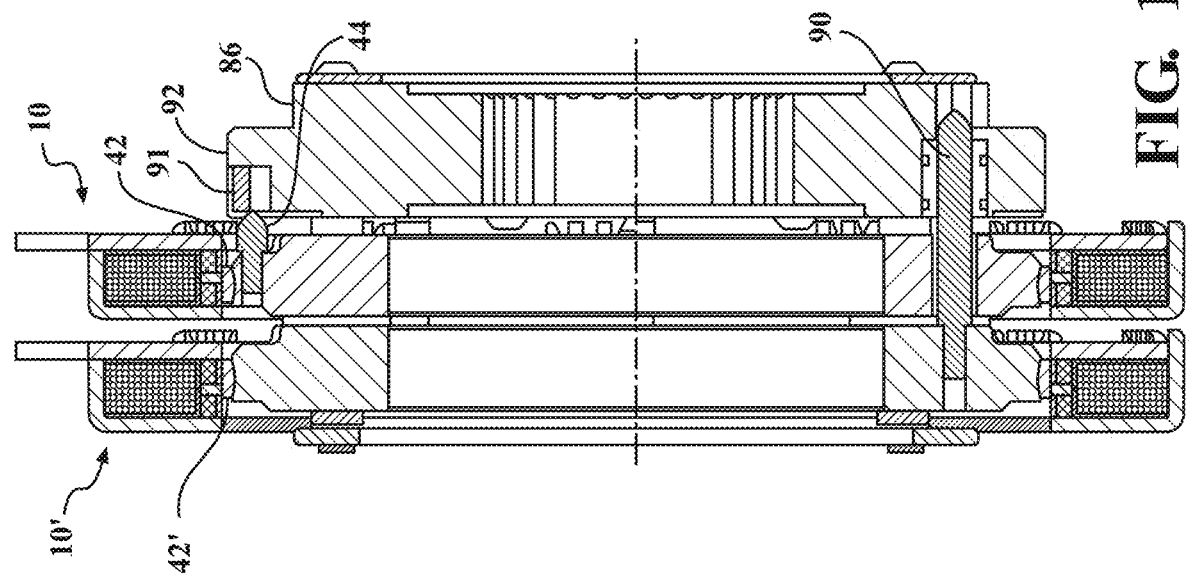

Referring to FIGS. 14A and 14B, wherein like primed reference characters represent similar elements, two linear actuation assemblies 10, 10' are shown fixedly secured to each other and to a device 86 being operated on by the linear actuation assembly 10 (the linear actuation assembly 10' operates on a device not shown in these Figures and is only shown to depict how these linear actuation assemblies 10, 10' may be packaged and work together). These Figures show the entire translator 42, 42' extending along the entire inner diameter of the electromagnetic coil 30, 30'. Although not shown, the translators 42, 42' have a hollow center to allow devices to pass therethrough. The linear actuation assemblies 10, 10' are shown to be positioned by a positioning pin 90. There is a plurality of positioning pins 90 extending through the linear actuation assemblies 10, 10'; however, only one is shown in these Figures due to the cross-sectional view. Likewise, there is only one plunger 44 shown extending from the linear actuation assembly 10 even though there is a plurality of plungers 44 equidistantly spaced thereabout. None of the plungers for the linear actuation assembly 10' are shown in these Figures.

Both FIGS. 14A and 14B show the leftmost linear actuation assembly 10' in an "ON" state. In FIG. 14A, the rightmost linear actuation assembly 10 is in the "OFF" state. In FIG. 14B, the rightmost linear actuation assembly 10 is in the "ON" state. Regardless of the state each of these linear actuation assemblies 10, 10' are in, the operation of the electromagnetic coils 12, 12' cannot be determined because the design of these linear actuation assemblies 10, 10' provide the function of latching in either state.

The device 86 is a pocket plate of a radial clutch. It includes a plurality of struts 91 (one shown), one strut 91 for each plunger 44 of the linear actuation assembly 10. In FIG. 14A, the linear actuation assembly 10 is in the "OFF" state; the plungers 44 are retracted and the struts 91 are flush with the rest of the pocket plate 86, allowing the pocket plate 86 to rotate. In FIG. 14B, the linear actuation assembly 10 is in the "ON" state; the plungers 44 are extended forcing the struts 91 to extend out from the outer diameter 92 of the pocket plate 86, preventing the pocket plate 86 from rotating with respect to mechanism/piece that is disposed immediately adjacent the outer diameter 92 of the pocket plate 86.

A particularly desirable feature of the described electromagnetic actuation assembly 10 is its ability to function as an axial force and movement machine while at the same time having the translator 42 rotating in synchronous or even asynchronous with an axially adjacent load mechanism, such as a clutch controlling an epicyclic gear train.

Figure 15:
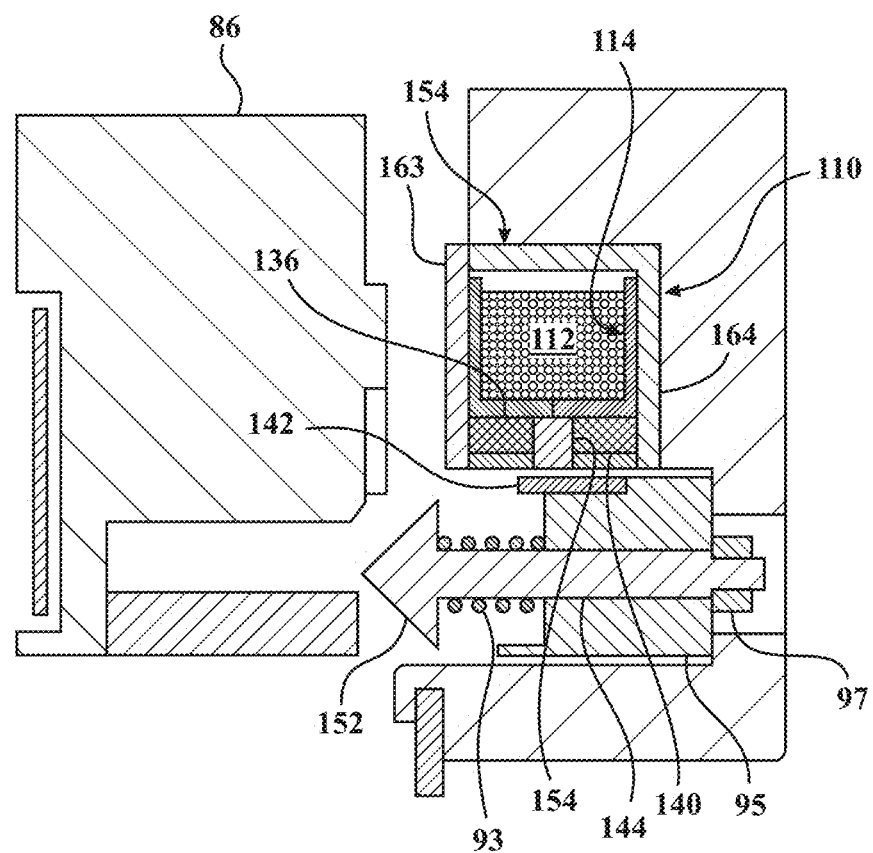
FIG. 15 is a cross-sectional side view of a linear actuation assembly using an alternative plunger design.

Referring to FIG. 15, a second alternative embodiment of the linear actuation assembly is generally indicated at 110, wherein like elements from the first two embodiments are indicated by reference characters offset by 100. In this embodiment, the plunger 144 is spring loaded with a spring 93, which is compressed between the pointed distal end 152 of the plunger and a plunger frame 95. A nut 97 is secured to the end of the plunger 144 opposite the pointed distal end 152 and provides a stop for axial movement of the plunger 144 with respect to the plunger frame 95. In operation, this linear actuation assembly 110 provides lost motion between the translator 142 and the plunger 144 should the pointed distal end 152 of the plunger 144 not align perfectly with an opening in the pocket plate 86. The translator 142 and plunger frame 95 move axially even if the plunger 144 is stopped from axial movement due to its abutment against the pocket plate 86. Once an opening in the pocket plate 86 is made available, the spring 93 forces the pointed distal end 152 of the plunger 144 into the pocket plate 86 to move a strut 91 (not shown in this Figure).

Figure 16:
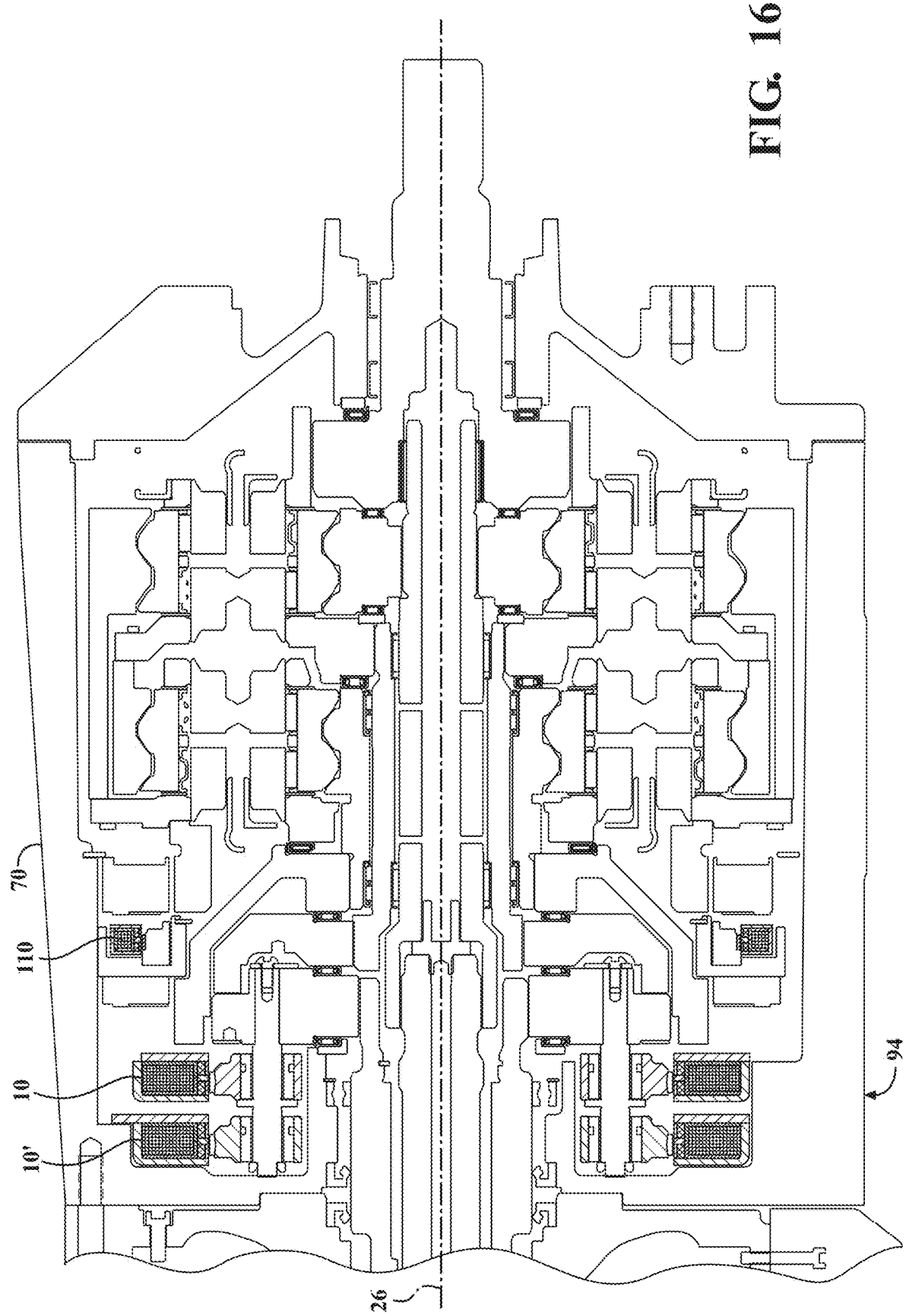
FIG. 16 is a cross-sectional side view of a vehicular transmission incorporating clutches that utilize linear actuators therein.

Referring to FIG. 16, the two linear actuation assemblies 10, 10' are shown operating in a transmission, generally shown at 94, including the transmission housing 70. The second embodiment 110 is also used in this transmission 94. A third version of the linear actuation assembly 10" is also designed into the transmission 94. The transmission 94 is the subject of a U.S. patent application Ser. No. 16/816,509, the disclosure of which is hereby expressly incorporated into this patent application.

Figure 17:
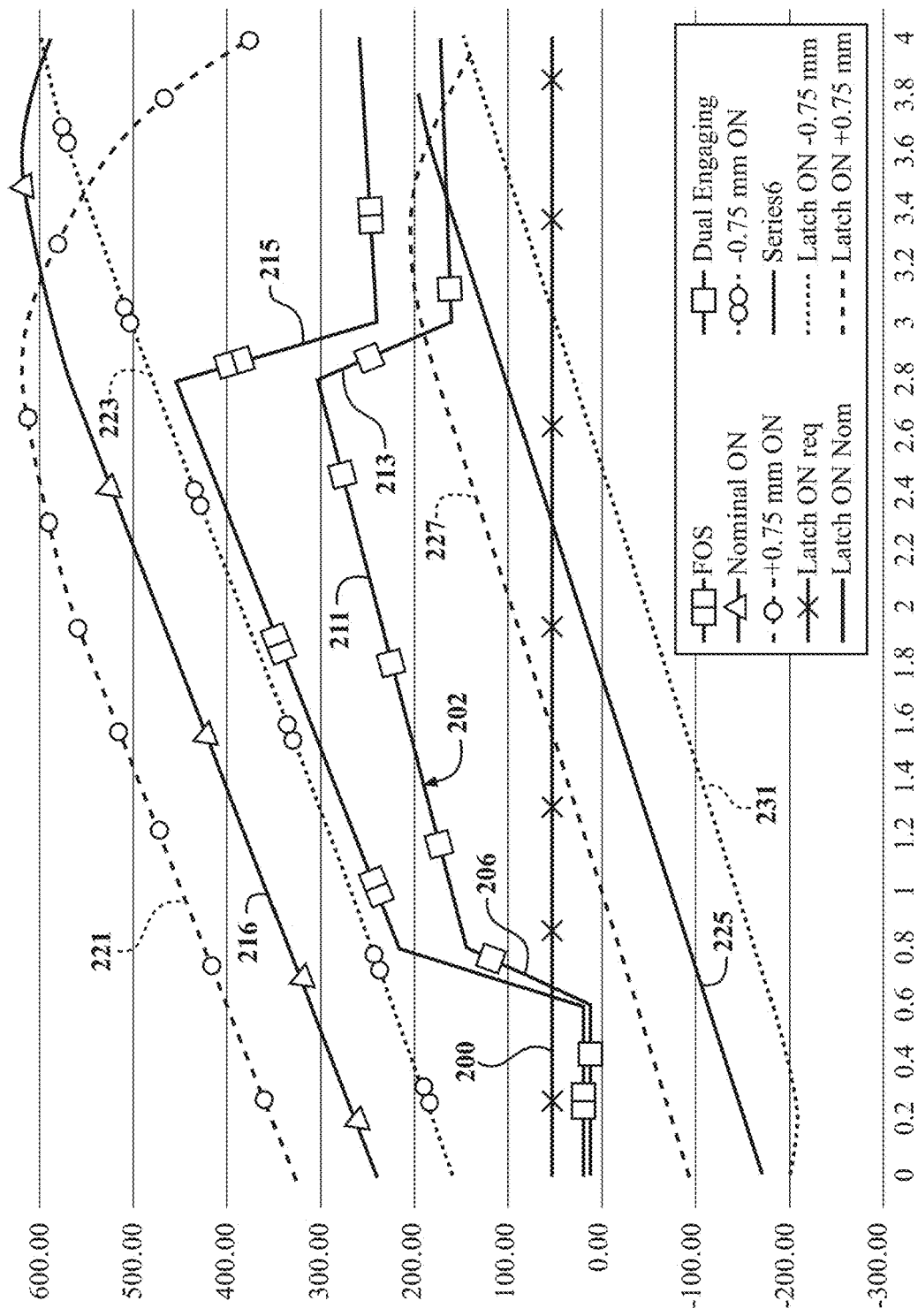
FIG. 17 is a graphic representation of the forces required to operate one of the linear actuators in the vehicular transmission shown in FIG. 16.

Referring to FIG. 17, a graph of forces required to operate the linear actuation assembly 10 in the transmission 94 are shown. The graph represents force (y-axis) as a function of position of the translator (x-axis). The forces are measured in Newtons and the distance is measured in millimeters.

A line 200 is a horizontal line representing the force required to magnetically latch the translator 42. This force does not vary. This magnetically latching force will be discussed in greater detail subsequently.

A discontinuous line, generally shown at 202 represents the mechanical resistance required to be overcome to move the translator 42. For the first approximately 0.6 mm, the force is relatively small and constant. This portion of the line 202 is shown as line segment 204. Once the translator 42 has moved 0.6 mm, the force required to move the translator 42 increases. The slope of the linear segment 206 is much greater than the first 0.6 mm. The increase in required force is due to the requirement to overcome the centrifugal force working on the cam (strut 91) as well as the compression of a return spring 93 (if present). Once the translator 42 reaches approximately 0.8 mm, the mechanical resistance increases, but at a lower rate. This is represented by line segment 211. At approximately 2.8 mm of translator 42 axial displacement, the mechanical force required drops, as is represented by the line segment 213. This is due to the design profile of the cam. As the translator 42 moves past approximately 3.0 mm, the mechanical resistance returns to a relative constant. For the translator 42 to move across this length, forces generated by the linear actuation assembly 10 have to be greater than the mechanical resistance represented by the discontinuous line 202 at all points therealong. A second discontinuous line 215 has similar line segments as those of the first discontinuous line 202. The second discontinuous line 215 is offset from the first discontinuous line 202 by a factor of 1.5. This is a factor of safety built into the linear actuation assembly 10.

When operating the linear actuation assembly 10, the electromagnetic forces created thereby are represented by a first force line 116. These are the forces generated by current passing through the electromagnetic coil 12. At any point on along the length of movement of the translator 42, the electromagnetic forces generated by the linear actuation assembly 10 must be greater than the mechanical resistance of the translator 42. As is shown with the data represented by the graph in FIG. 17, this is the case.

First 221 and second 223 dashed lines represent the forces required if the translator 42 were advanced or retracted from its ideal position by ±0.75 mm, respectively. As can be seen when viewing the data represented in the graph of FIG. 17, even with the translator 42 out of position, the electromagnetic forces created by the linear actuation assembly 10 are sufficient to overcome the worst case scenario mechanical resistance forces generated by the operation of the translator 42.

A second force line 225 represents the magnetic latch force of the linear actuation assembly 10. More specifically, this is the magnetic force required to latch the translator 42 into a position. As the translator 42 moves from its original position (0.0 mm), the magnetic force increases due to the position of the magnets 36, 40. Two dashed lines 227, 231, similar to the dashed lines 221, 223, represent the forces required if the translator 42 were advanced or retracted from its ideal position by ±0.75 mm, respectively. Regardless of whether the translator 42 is in its ideal position (line 225) or some other position (between lines 227 and 231), the magnetic forces of the linear actuation assembly 10 are greater than the magnetic latch force requirement as represent by force line 200 when the translator 42 has moved almost to one end or the other. (FIG. 17 represents forces in one direction. Forces to move the translator 42 in the other direction are not shown as the forces acting on the translator 42 in the opposite direction are much higher resulting in a much faster movement eliminating the need to track the position or forces.)

Figure 18:
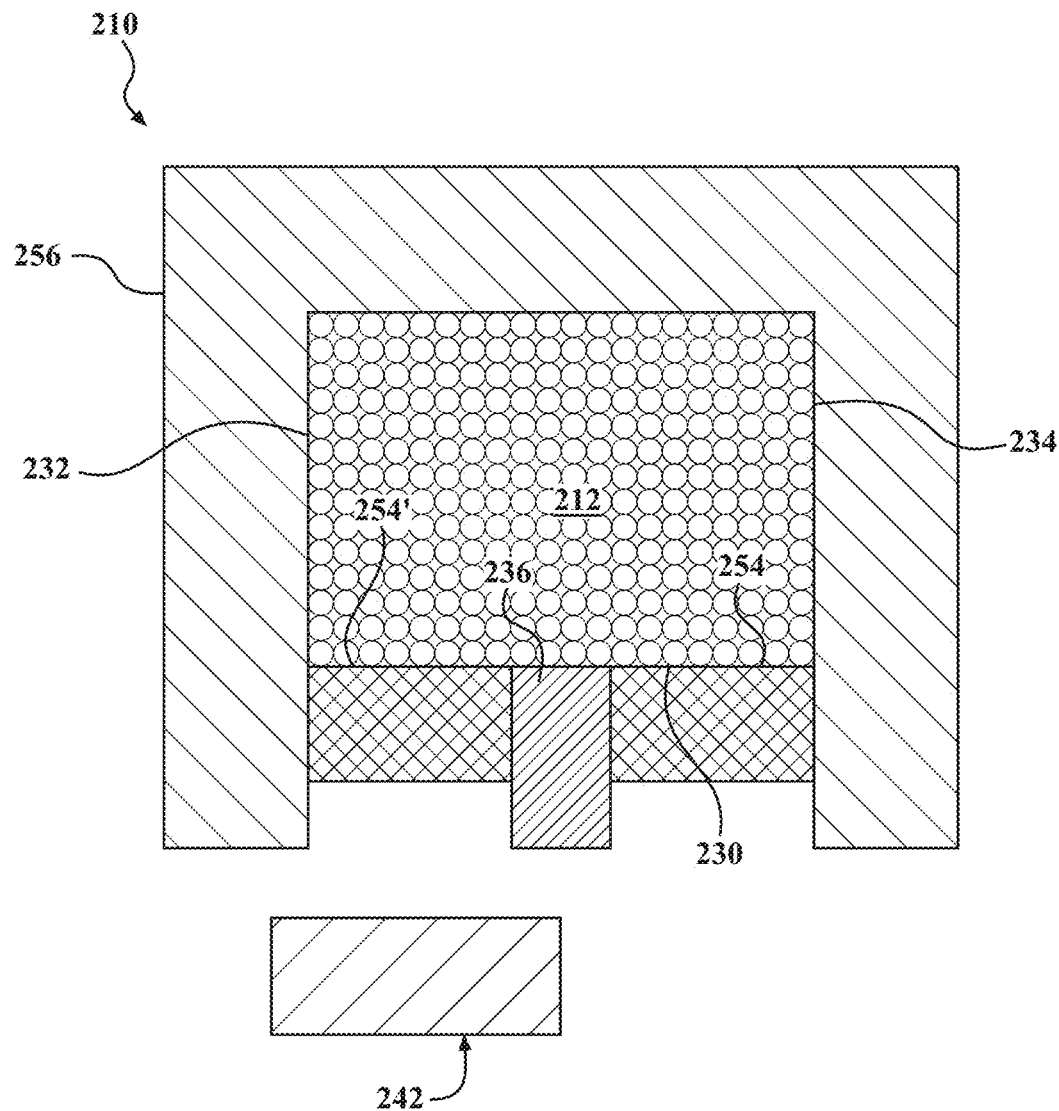
FIG. 18 is a cross-sectional side view of a second embodiment of a linear actuator having only one set of magnets.

Referring to FIG. 18, wherein like reference characters as those described above are offset by 200, a second alternative embodiment of a linear actuator 210 is shown. The difference between the linear actuation assembly 10 and the linear actuator 210 is that the second linear actuator 210 has only one set of magnets 236 centered below the electromagnetic coil 212. The translator 242 will still move based on the direction of the current flowing through the electromagnetic coil 212. Likewise, it will also latch in place even when the current passing through the electromagnetic coil 212 has stopped. The ring 254 is on one side of the first set of magnets 236 whereas a second ring 254' is on the other side of thereof, thus positioning the first set of magnets 236 in the center between the two sides 232, 234 of the electromagnetic coil 212.

Figure 19A:
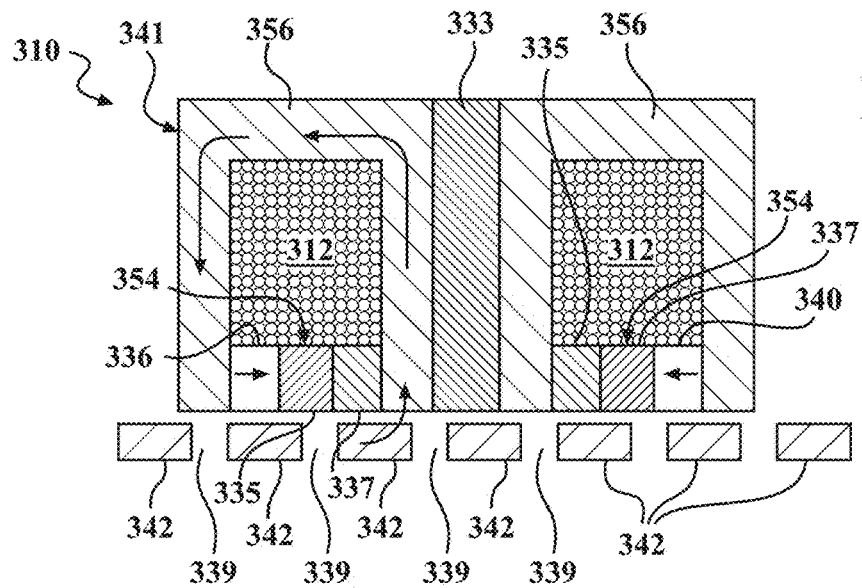
FIGS. 19A through 19C are cross-sectional side views of a linear actuator with its translator in one of three positions, respectively.
Figure 19B:
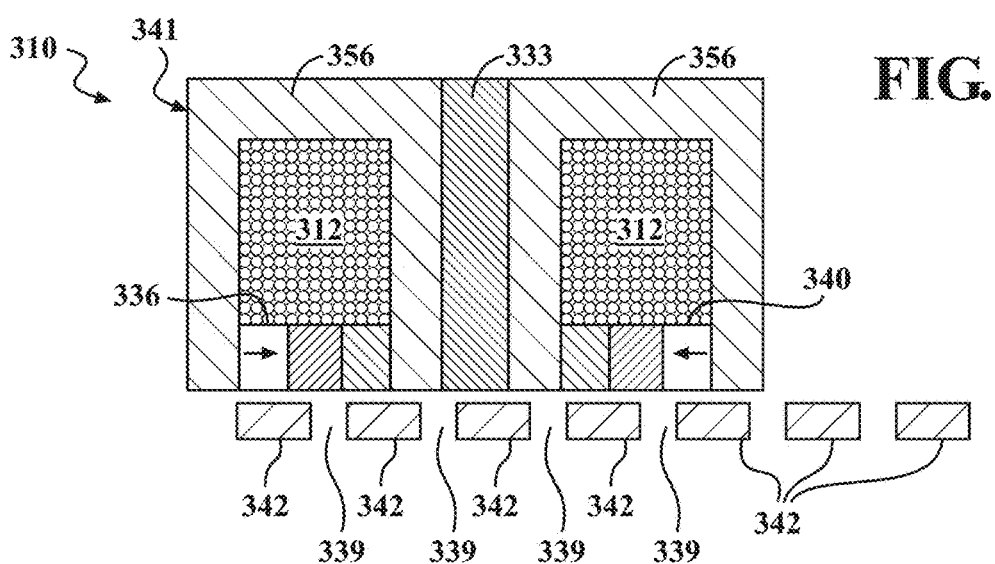
Figure 19C:
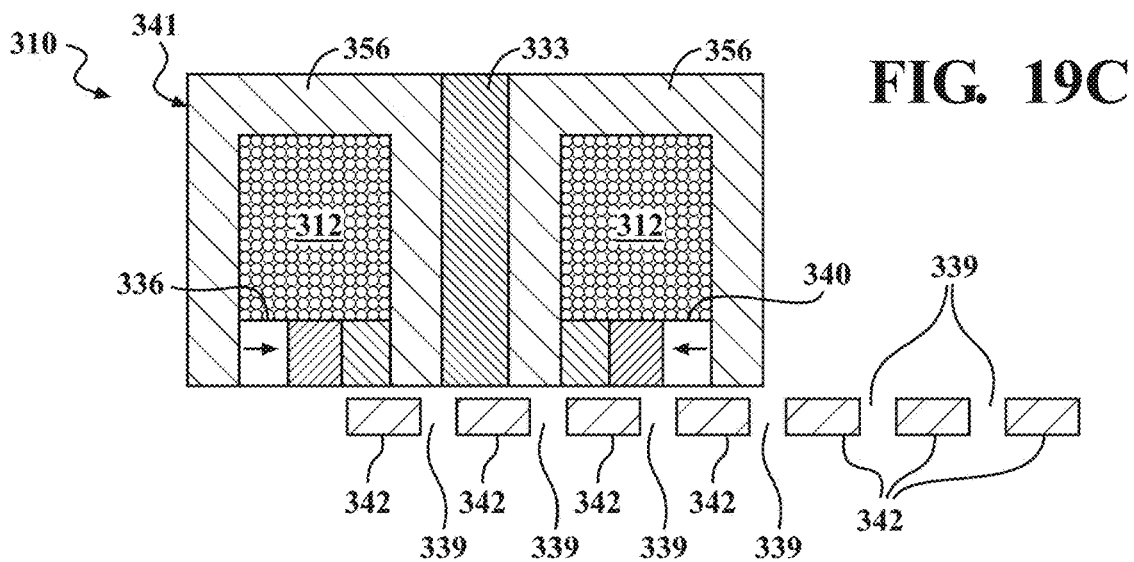

Referring to FIGS. 19A through 19C, a third alternative embodiment of the linear actuation assembly is shown at 310, wherein like reference characters are offset from those in the first embodiment by 310. This linear actuation assembly 310 has many of the same elements as described in the embodiment disclosed above. This linear actuation assembly 310 includes two electromagnetic coils 312 separated by a non-ferromagnetic barrier 333. The non-ferromagnetic barrier 333 may be fabricated from aluminum. The non-ferromagnetic barrier 333 inhibits the electromagnetic fields from each of the electromagnetic coils 312 from intermingling.

Another difference between this embodiment 300 and the prior embodiment is that the two electromagnetic coils 312 share the two sets of magnets 336, 340, with the first set of magnets 336 under the leftmost electromagnetic coil 312 (based on the orientation of FIGS. 19A through 19C) and the second set of magnets 340 is under the rightmost electromagnetic coil 312. And yet a third difference is that the ring 354 includes a plurality of ringlets 335, 337. The first ringlet 335 is steel, similar to the ring 354 in the first embodiment. The second ringlet 337 is non-ferromagnetic and fabricated from aluminum. The barrier created by the second ringlet 337 forces the electromagnetic field to flow down below the stator 341.

The electromagnetic field extending down below the stator 341 is received by a plurality of translators 342. Each translator 342 is identical to the other and spaced apart from each other. In other words, there is a space 339 between each of the translators 342.

This linear actuation assembly 310 is designed to latch in more than two positions. The number of positions it is able to latch in is defined by the equation:

Number of Latches=Number of Translators−4    Equation 1

The linear actuation assembly 310 that is capable of operating in more than two latching positions requires four more translators 342 than latching positions. FIGS. 19A through 19C show the linear actuation assembly 310 moving between three distinct positions. As such, the linear actuation assembly 310 includes seven translators 342.

Figure 20:
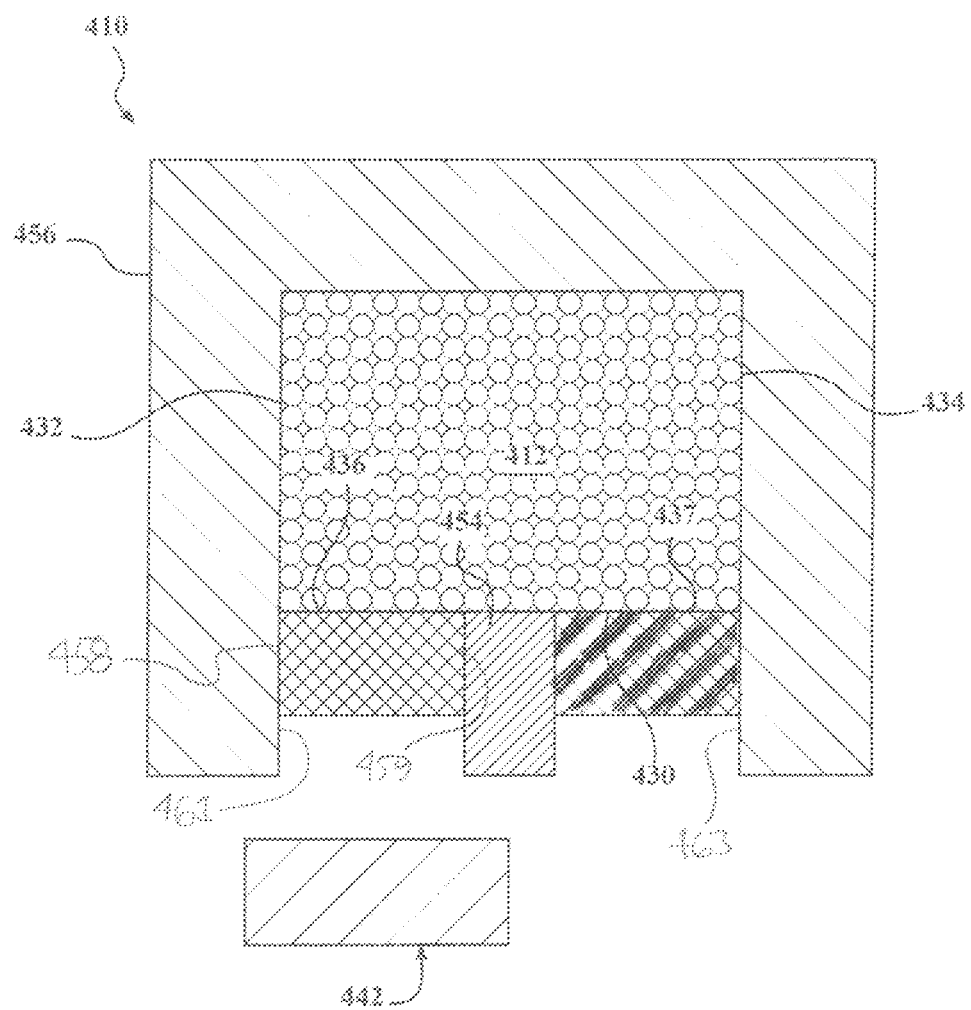
FIG. 20 is a cross-sectional side view of a fourth embodiment of a linear actuator having only one set of magnets.

Referring to FIG. 20, a fourth alternative embodiment of the linear actuation assembly is shown at 410, wherein like reference characters are offset from those in the first embodiment by 400. This linear actuation assembly 410 has many of the same elements as described in the embodiment disclosed above and illustrated in FIGS. 18 through 19C. The difference between the linear actuation assembly 10 and the linear actuator 410 is that the fourth linear actuator 410 has only one set of magnets 436 extending about the linear actuator in the same location as the first set of magnets 36 for the first embodiment of the linear actuator 10. Therefore, the set of magnets 436 is not centered like the set of magnets 236 in the second alternative embodiment of the linear actuation assembly 210 (FIG. 18), but off to one side of the linear actuation assembly 410, like one half of the third embodiment 310 shown in FIGS. 19A-19C. In this embodiment, the ring 454 is ferromagnetic and it is centered within this embodiment of the linear actuation assembly 410.

The set of magnets 436 define a first side 458 and a second side 459. The first side 458 of the set of magnets 436 is abuts a first interior surface 461 of the stator cover 456. The second side 459 abuts the ring 454. A non-ferromagnetic spacer or ring 437 extends between the ferromagnetic ring 454 and a second interior side 463 of the stator cover 456, which is disposed adjacent the other bobbin side 434. The translator 442 will still move based on the direction of the current flowing through the electromagnetic coil 412. Likewise, the translator 442 will latch in place even when the current passing through the electromagnetic coil 412 has stopped because the ferromagnetic ring 454 concentrates the magnetic field passing therethrough acting as a flux barrier forcing magnetic flux to collect and focus the flux in the translator 442. The ferromagnetic ring 454 acts as a flux path.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A linear actuation assembly comprising:
   an electromagnetic coil configured to allow electric current to pass therethrough in either direction creating magnetic flux based on the electric current and its direction, said electromagnetic coil defining a center axis, an inner diameter, and first and second coil sides;
   a stator cover extending over said electromagnetic coil, said stator cover fabricated from a ferromagnetic material, said stator cover defining first and second interior surfaces;
   a set of magnets disposed end-to-end adjacent said first coil side of said electromagnetic coil at said inner diameter thereof, said set of magnets fixedly secured with respect to said electromagnetic coil and defining a first side and a second side of said set of magnets, wherein said first side of said set of magnets is disposed adjacent said first interior surface of said stator cover;
   a ferromagnetic central ring disposed within said electromagnetic coil at said inner diameter thereof, said ferromagnetic central ring disposed adjacent said second side of said set of magnets; and
   a translator disposed between said set of magnets and said central axis of said electromagnetic coil, said translator latchable between a first position disposed adjacent said first side of said set of magnets and a second position disposed adjacent said second side of said set of magnets in response to said magnetic flux and the direction in which the electric current is flowing.

2. A linear actuation assembly as set forth in claim 1 including a non-ferromagnetic ring disposed within said electromagnetic coil at said inner diameter thereof, said non-ferromagnetic ring extending between said ferromagnetic central ring and said second interior surface of said stator cover.

* * * * *